(12) United States Patent
Gobina (10) Patent No.: US 7,297,184 B2
(45) Date of Patent: Nov. 20, 2007

(54) APPARATUS AND METHOD FOR SEPARATING GASES

(75) Inventor: Edward Gobina, Aberdeen (GB)

(73) Assignee: Robert Gordon University, Schoolhill, Aberdeen (GB)

( * ) Notice: Subject to any disclaimer, the term of this patent is extended or adjusted under 35 U.S.C. 154(b) by 0 days.

(21) Appl. No.: 11/328,528

(22) Filed: Jan. 10, 2006

(65) Prior Publication Data

US 2006/0112822 A1    Jun. 1, 2006

Related U.S. Application Data

(63) Continuation of application No. 10/471,527, filed as application No. PCT/GB02/01079 on Mar. 18, 2002, now Pat. No. 7,048,778.

(30) Foreign Application Priority Data

Mar. 16, 2001   (GB)   ................. 0106478.1

(51) Int. Cl.
  *B01D 53/22*  (2006.01)
  *B05B 3/00*   (2006.01)
(52) U.S. Cl. ............. 96/11; 96/4; 96/8; 96/10; 96/12; 96/45; 96/51; 96/54; 423/335; 427/245; 427/344; 427/387; 427/397.7
(58) Field of Classification Search ........ 96/4, 96/7, 8, 10, 11, 12; 94/45, 47, 49, 51, 52, 94/54; 423/335; 427/245, 344, 385.5, 387, 427/397.7
See application file for complete search history.

(56) References Cited

U.S. PATENT DOCUMENTS

| | | | |
|---|---|---|---|
| 3,489,693 A | 1/1970 | Bovard ............... 502/400 |
| 3,557,011 A | 1/1971 | Columbo et al. ..... 252/189 |
| 4,037,891 A | 7/1977 | Walters ................ 308/187.1 |
| 4,056,373 A | 11/1977 | Rubin .................. 96/10 |
| 4,175,153 A | 11/1979 | Dobo et al. ........... 428/398 |
| 4,350,346 A | 9/1982 | Fowler ................. 277/26 |
| 4,394,023 A | 7/1983 | Hinojosa .............. 277/124 |
| 4,493,715 A | 1/1985 | Hogan et al. ......... 95/139 |
| 4,640,901 A * | 2/1987 | Lee et al. ............. 96/12 |
| 5,030,351 A | 7/1991 | Burggraaf et al. ..... 210/500.21 |
| 5,076,926 A | 12/1991 | Burggraaf et al. ..... 210/500.25 |
| 5,183,482 A | 2/1993 | Najjar et al. ......... 95/51 |
| 5,411,721 A | 5/1995 | Doshi et al. .......... 423/220 |
| 5,429,743 A | 7/1995 | Geus et al. ........... 210/490 |
| 5,443,187 A | 8/1995 | Samuelson ............ 222/595 |
| 5,635,148 A | 6/1997 | Shadman .............. 423/210 |
| 5,637,544 A | 6/1997 | Shadman .............. 502/4 |

(Continued)

FOREIGN PATENT DOCUMENTS

EP   0 575 945 A2   6/1993

(Continued)

*Primary Examiner*—Jason M. Greene
(74) *Attorney, Agent, or Firm*—Drinker Biddle & Reath LLP (57) ABSTRACT

An apparatus and method to separate a mixture of gases—such as carbon dioxide and methane—by an inorganic membrane comprising a ceramic support and a silica layer made from a silicon elastomer sol. The apparatus and method can efficiently separate the gaseous mixture and can also cope with the extreme conditions found in e.g. hydrocarbon producing wells. A method of manufacturing the apparatus is also disclosed.

22 Claims, 6 Drawing Sheets

U.S. PATENT DOCUMENTS

| | | | |
|---|---|---|---|
| 5,772,735 A | 6/1998 | Sehgal et al. | 95/45 |
| 5,782,959 A | 7/1998 | Yang et al. | 96/11 |
| 5,810,912 A | 9/1998 | Akiyama et al. | 96/11 |
| 5,997,829 A | 12/1999 | Sekine et al. | 423/210 |
| 6,152,986 A * | 11/2000 | Foller | 95/47 |
| 6,203,707 B1 * | 3/2001 | Hartmann | 96/8 |
| 6,296,686 B1 | 10/2001 | Prasad et al. | 95/51 |
| 6,299,669 B1 | 10/2001 | Koros et al. | 95/51 |
| 6,315,968 B1 | 11/2001 | Quinn et al. | 423/220 |
| 6,454,836 B1 | 9/2002 | Koelmel et al. | 95/46 |
| 6,471,745 B1 | 10/2002 | Foley et al. | 95/54 |
| 6,494,937 B1 * | 12/2002 | Edlund et al. | 96/11 |
| 6,688,477 B2 * | 2/2004 | Kalthod | 96/4 |
| 6,716,275 B1 | 4/2004 | Reed et al. | 96/10 |
| 6,730,364 B2 | 5/2004 | Hong et al. | 427/535 |
| 2002/0189445 A1 * | 12/2002 | Miller et al. | 95/51 |

FOREIGN PATENT DOCUMENTS

| | | | |
|---|---|---|---|
| EP | 0 585 820 | 3/1994 | 53/22 |
| JP | 55-137209 A | 10/1980 | |
| JP | 1236918 | 9/1989 | |
| JP | 5-057162 A | 3/1993 | |
| JP | 7-313853 * | 12/1995 | |
| JP | 7-313853 A | 12/1995 | |
| JP | 8-071386 A | 3/1996 | |
| JP | 9-173798 A | 7/1997 | |
| JP | 10-052629 A | 2/1998 | |
| JP | 2000-334250 A | 12/2000 | |
| JP | 2001-276586 A | 10/2001 | |
| WO | WO 02/074421 | 3/2002 | 53/22 |

* cited by examiner

APPARATUS AND METHOD FOR SEPARATING GASES

CROSS REFERENCE TO RELATED APPLICATIONS

This application is a continuation of U.S. Pat. No. 7,048,778 (application Ser. No. 10/471,527), having a §371(c) filing date of Sep. 10, 2003, which is a national phase of International Patent Application No. PCT/GB02/01079, filed Mar. 18, 2002, which is incorporated herein by reference in its entirety.

BACKGROUND

This invention relates to an apparatus and method for separating gases and in particular an apparatus comprising inorganic membranes for removing acidic gases from natural gas.

Natural gas reserves known to contain a relatively high content of nitrogen, carbon dioxide or hydrogen sulphide are rarely recovered due to the costs incurred to purify the gas mixture.

Impure methane is also commonly produced by landfill sites but its commercial exploitation is generally prohibited by the costs associated with purifying it.

Current processing systems are generally regarded to be uneconomical above 1.5% levels of carbon dioxide. To remove carbon dioxide from natural gas, chemical scrubs are commonly used. This results in a significant amount of waste product which must be suitably disposed of, adding further costs to remove the carbon dioxide.

Moreover, the mechanical equipment used with such chemical scrubs is susceptible to failure.

SUMMARY

According to a first aspect of the present invention, there is provided an apparatus to separate at least one first gas from a mixture comprising the at least one first gas and at least one second gas, the apparatus comprising a membrane adapted to permit passage of the at least one first gas therethrough whilst substantially preventing passage of the at least one second gas therethrough.

Preferably, the membrane is an inorganic membrane.

The first gas may be water vapour, nitrogen or preferably carbon dioxide.

Preferably, the apparatus separates a gas mixture comprising natural gas an acidic gas, and typically, the acidic gas is the first gas and the natural gas is the second gas.

The acidic gas in preferred embodiments is carbon dioxide although other acidic gases such as hydrogen sulphide, may be the first gas.

Preferably, the inorganic membrane is formed such that it maximises the contact of the gaseous mixture with the surface of the inorganic membrane. Preferably, the inorganic membrane is provided as a tube comprising a bore. Optionally, a series of tubes may be used, and the tube may be corrugated or coiled. The gaseous mixture may be directed through the bore of the tubes and separated according to the present invention.

More preferably, each tube is an inner tube provided within an impermeable second outer tube. Preferably, the gaseous mixture is injected into the annulus between each pair of outer and inner tubes.

Preferably, a graphite seal mounts each inner tube in each outer tube.

Preferably, the inorganic membrane comprises a means to control the type of gaseous molecules passing therethrough. Preferably the outer diameter of the inner tubes is between 5-12 mm, more preferably 10 mm.

Preferably the thickness of the, inner tubes is between 1.5 and 2 mm, more preferably 1.7 mm. There may be any number of inner tubes although preferably there are between 10 and 50 inner tubes depending on the flow rate and the purity of the gaseous mixture. Preferably, the inner tubes are approximately 1 metre in length.

Preferably, the inorganic membrane comprises a plurality of chemically discreet portions. Preferably, a first portion is a separating layer. Preferably, a second portion is a support.

Preferably, the separating layer comprises a layer adapted to allow passage of the at least one first gas through the membrane and resist passage of the at least one second gas through the membrane.

Preferably, the separating layer comprises any one of, a combination of, or all of; silica, magnesium oxide, gamma alumina or a molecular sieve. Preferably, the molecular sieve is a carbon molecular sieve.

The support may comprise alpha alumina, stainless steel, carbon or any other suitable inorganic material.

Preferably, the separating layer is provided on a surface of the support, and where the support is a tube, the separating layer may be provided on a surface of the inner bore of the tube.

The layer(s) of the separating layer may be provided in any order although in preferred embodiments, a layer of gamma alumina is first added to the support. Typically, a layer of silica is then added on top of the layer of gamma-alumina. Optionally, a molecular sieve may be added as a further layer.

More preferably, the separating layer has a chemical affinity for the at least one first gas. A group II metal oxide, preferably magnesium oxide, may be added, optionally in place of the silica and molecular sieve, to increase the chemical affinity of the at least one first gas towards the membrane.

According to a second aspect of the present invention, there is provided an apparatus to separate at least one first gas from a mixture comprising the at least one first gas and at least one second gas, the apparatus comprising a first tube and a second tube, the first tube comprising a membrane adapted to permit passage of the at least one first gas therethrough whilst substantially preventing passage of the at least one second gas therethrough, the first tube being mounted substantially within the second tube and being sealed therein by a graphite seal.

Preferably, the membrane is the membrane according to the first aspect of the invention.

According to a third aspect to the present invention, there is provided a method of manufacturing apparatus to separate at least one first gas from a mixture comprising the at least one first gas and at least one second gas, the apparatus comprising a membrane adapted to permit passage of the at least one first gas therethrough whilst substantially preventing passage of the at least one second gas therethrough, the method comprising providing a support; immersing the support in a sol; removing the support from the sol; and allowing the support to dry.

Preferably, the membrane is an inorganic membrane.

Preferably, the support is a ceramic support.

Preferably, the membrane manufactured according to the second aspect of the invention is the membrane provided according to the first aspect of the invention.

Preferably, the following steps of the method: immersing the support in a sol; removing the support from the sol; and allowing the support to dry; are repeated at least once. More preferably, said steps of the method are repeated twice.

Preferably, the sol is in the liquid state and forms at least a portion of the separating layer. Preferably, the sol coats the support. Preferably, the sol forms at least a part of the separating layer.

Preferably, the support is dried by applying heat.

In certain embodiments, the method may be repeated to coat the support with a second sol.

Optionally, the support may be coated with a molecular sieve, preferably a carbon molecular sieve, instead of, although preferably, in addition to, other sols. In such embodiments carbonisation is preferably affected by heating the support with the carbon molecular sieve in an argon atmosphere.

According to a fourth aspect of the present invention, there is provided a method to separate at least one first gas from a mixture comprising the at least one first gas and at least one second gas, the method comprising the steps of bringing said mixture into contact with a membrane; allowing passage of the at least one first gas through the membrane whilst substantially preventing passage of the at least one second gas through the membrane.

Preferably, the membrane is an inorganic membrane.

Preferably, the method according to the third aspect of the invention is used in conjunction with the apparatus according to the first aspect of the invention.

In certain embodiments of the invention, the method is performed in a downhole environment.

Typically, the at least one first gas includes an acidic gas. Preferably, the at least one first gas includes carbon dioxide. More preferably, the at least one first gas and the at least one second gas may be recovered, suitable for use with alternative applications.

Typically, the at least one second gas includes a hydrocarbon gas. Preferably, the at least one second gas includes methane. Preferably, said mixture is essentially a mixture of methane and carbon dioxide.

Alternatively, the apparatus and method may be used to remove carbon dioxide from nitrogen. The apparatus and method according to any aspect of the invention may also be used to separate other gas, fluid, or liquid mixtures, for example, to remove hydrogen sulphide from methane.

It is to be understood that both the foregoing general description and the following detailed description are exemplary and explanatory and are intended to provide further explanation of the invention as claimed.

BRIEF DESCRIPTION OF THE DRAWINGS

Embodiments of the present invention will now be described by way of example only, with reference to the following diagram, wherein.

DETAILED DESCRIPTION

Reference will now be made in detail to various embodiments of the present invention, examples of which are illustrated in the accompanying drawings.

EXAMPLE 1

Figure 1A:
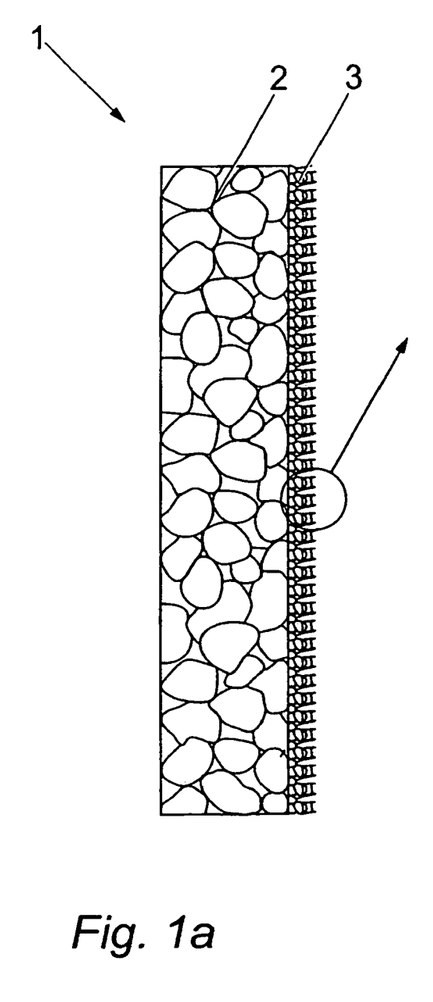
FIG. 1a is a side view of an inorganic membrane according to the present invention.
Figure 1B:
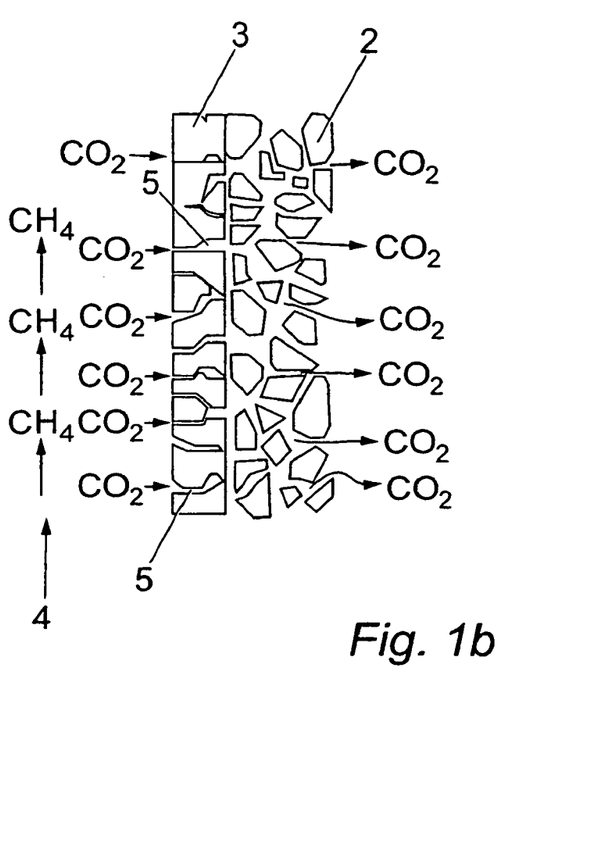
FIG. 1b is an enlarged side view of the inorganic membrane according to the present invention; and, FIG. 2 is a diagrammatic view of a tube comprising the inorganic membrane.

FIGS. 1a and 1b show an inorganic membrane 1 in accordance with the present invention. In summary, the membrane 1 is used to remove carbon dioxide $CO_2$ from a gaseous mixture comprising methane $CH_4$ and carbon dioxide $CO_2$ in accordance with the present invention. The inorganic membrane 1 comprises a relatively highly porous ceramic support 2 and a separation layer 3.

The support 2 is a coarse porous support, and this first preferred example of support 2 comprises 76% alpha alumina and 23% titania, the support 2 typically having a pore size of 500 nm and a porosity of 45%. Such a support 2 is commercially available, but hitherto has only been used as a filter for microfiltration. The support 2 may alternatively be made from any other suitable material, for example, silicon carbide, zirconia, stainless steel or carbon.

The separating layer 3 of FIGS. 1a and 1b is a layer of silica.

The membrane 1 is prepared by a repeated dip-coating technique. The support 2 is repeatedly dipped into a precursor or "sol" (not shown) and dried to form an evaporated layer of sol on the support 2, thereby forming the membrane 1.

The sol is prepared by mixing nine parts of isopentane and one part silicon elastomer, to obtain a clear and colourless sol. A curing agent such as one from the Sylgard® series is then added equivalent to one-tenth of the elastomer and the resulting sol mixed at room temperature.

Figure 4:
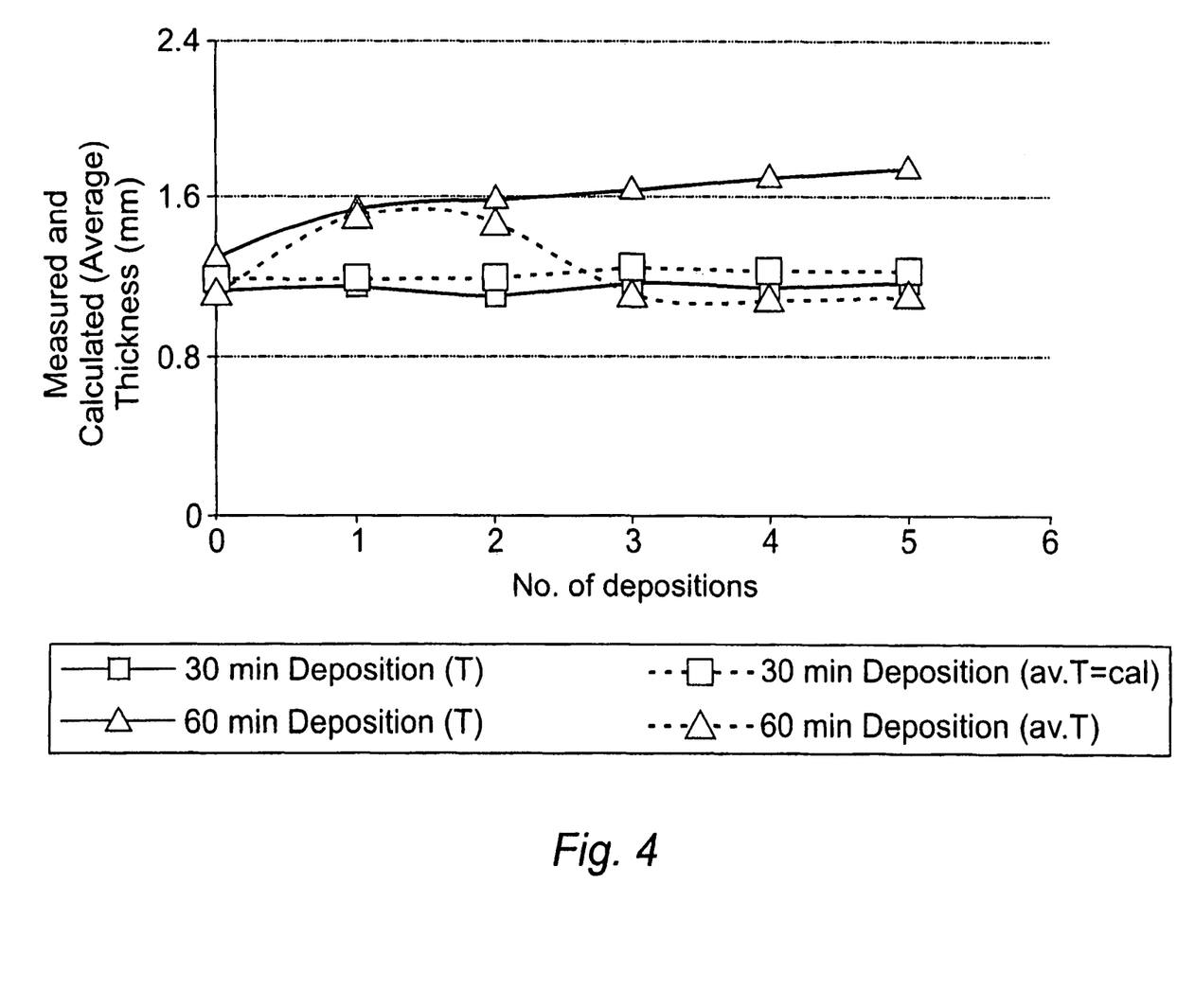
FIG. 4 is a graph showing the effect of deposition time on thickness of a silica membrane in accordance with the present invention.
Figure 5:
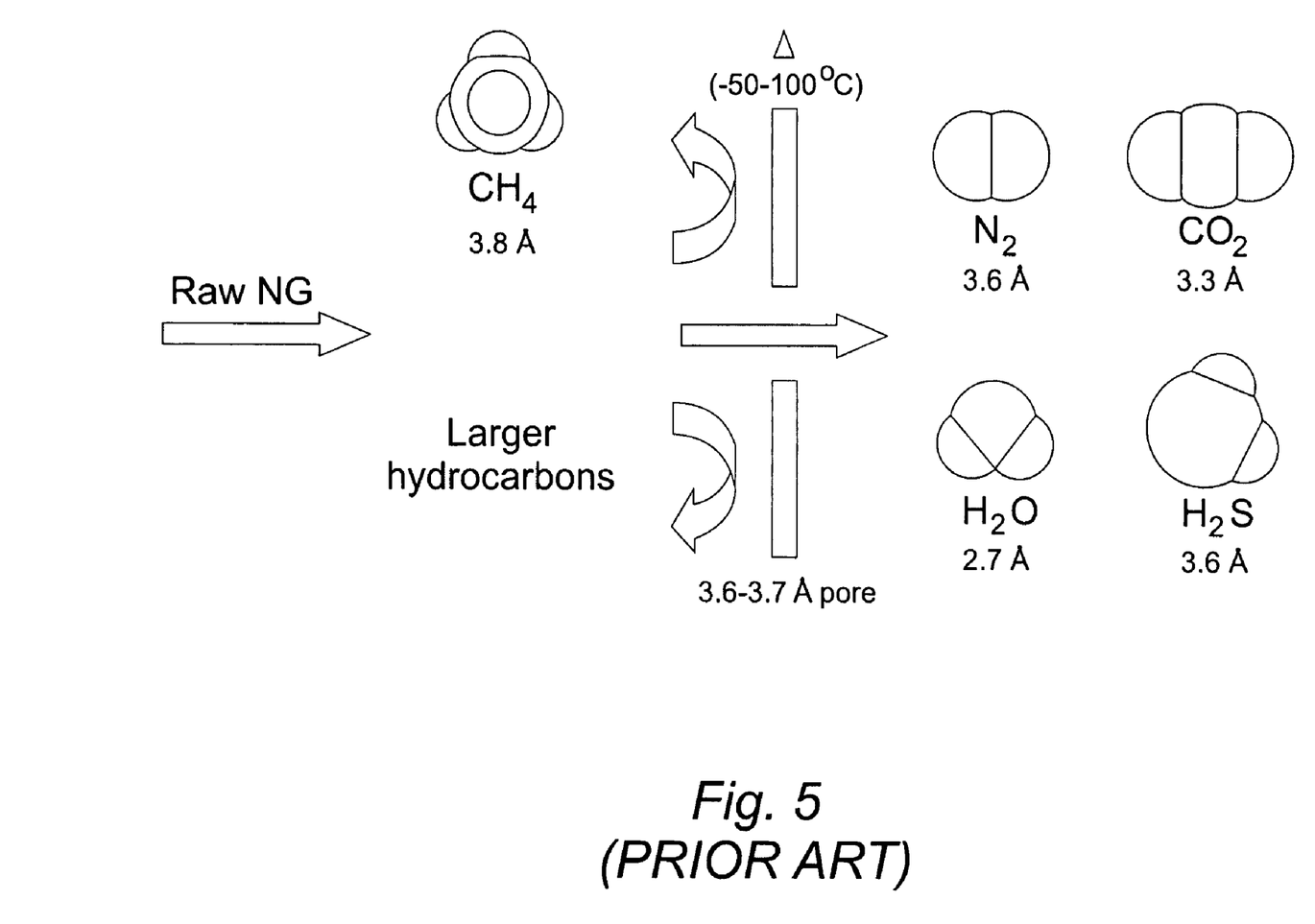
FIG. 5 is a schematic view of an inorganic membrane showing the permeation or retention of various molecules.

The sol is permitted to age over a period of 5-30 minutes (most preferably 20 minutes), and thereafter, the support 2 is immersed into the aged the support 2 by drying the support 2 at 65° C. for 24 hours in an oven to form a layer on the support 2. The procedure is repeated a number of times until the layer is of the required thickness, normally between 1-12 µm, preferably 6 µm. FIG. 4 shows the membrane thickness in relation to deposition time and No. of dips.

When a $CO_2$ molecule collides with the separation layer 3 of the inorganic membrane 1, it may be adsorbed into the separation layer 3 and proceed through the pores 5 in the support 2. The $CO_2$ molecule continues through the support 2 and is recovered along with other $CO_2$ molecules by any suitable means.

In contrast, when a $CH_4$ molecule collides with the separation layer 3 of the inorganic membrane 1, it is unlikely to be adsorbed into the separation layer 3 and will instead continue through the bore of the tube of the inorganic membrane 1 where it may be collected along with other $CH_4$ molecules. Generally, $CH_4$ molecules form bonds with the separation layer 3 less readily than $CO_2$ molecules.

Carbon dioxide is currently injected downhole to increase the rate of recovery of production fluids from reservoirs. The present invention therefore provides a means to obtain carbon dioxide proximate to where it may be used. A continuous loop is thus formed in which carbon dioxide is recovered from the natural gas and may be utilised to recover further production fluids. Indeed the $CO_2$ may never need to be transported to the surface as it may be transported from the membrane 1 to the reinjection point which saves on further time and cost.

The inorganic membrane may be formed as a flat sheet or preferably, in thin tubes having an inner diameter of, for example 3-11 mm and an outer diameter of for example 5-12 mm. The gaseous mixture 4 is directed through the inner bore of this tube membrane 1. Such tubes may be coiled or corrugated to increase the number of collisions between the molecules in the gaseous mixture 4 and the inner surface of the inorganic membrane 1.

Figure 7:
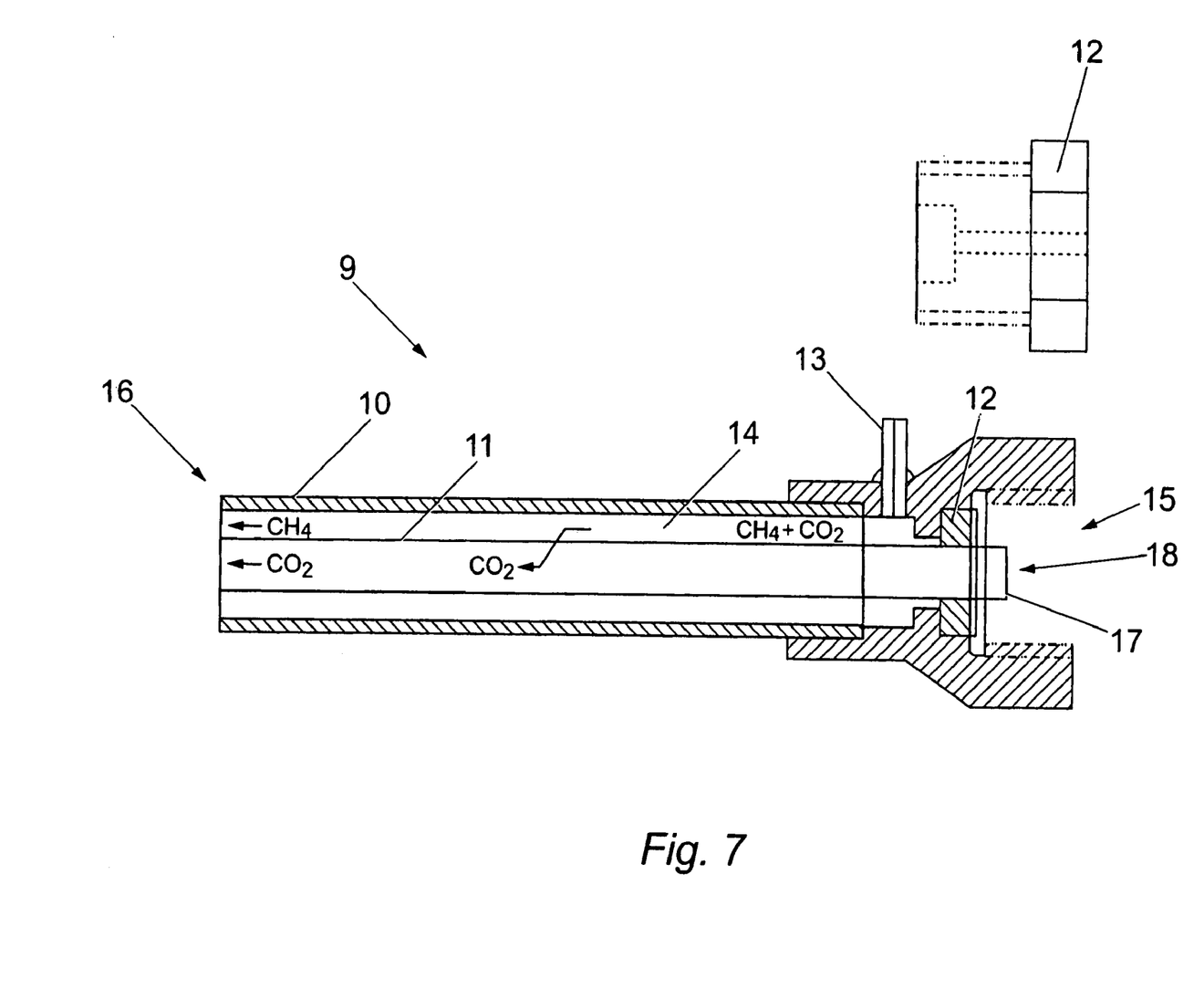
FIG. 7 is a side view of a tube comprising the inorganic membrane.

An example of the tube arrangement suitable for use in accordance with the present invention is shown in FIG. 7.

A tubular stainless steel vessel 9 comprises an inner tube 11, inlet ports 13, 17 and a seal 12. The inner tube 11 is made from the inorganic membrane 1 and the outer tube 10 can be made from any suitable material, such as stainless steel. Normally approximately 10 tubes are used in any one vessel 9, although only one end 15 of one tube is shown in FIG. 7. Certain embodiments of the invention with high flow rates may use more than 10 tubes. The seal 12 is preferably made from graphite as this is compressible, inert, high-temperature resistant to enable permeability studies at elevated temperatures, and cost effective. The second end 16 of the vessel 9 is not shown in FIG. 7, but typically mirrors the configuration of the first end 15.

The gaseous mixture 4 is injected through the inlet port 13 into the annulus 14 between the inner 11 and outer 10 tubes. In this example $CO_2$ molecules are separated from $CH_4$ molecules, but other mixtures may be separated. The mixture 4 flows through the annulus 14, the CO2 molecules selectively adsorbing in the inorganic membrane 1 which forms the tube 11. The second end 16 of the inner tube 11 of the vessel 9 corresponds to a first outlet (not shown), and the second end 16 of the annulus 14 of the vessel 9 corresponds to a second outlet (not shown). The relatively pure $CH_4$ and $CO_2$ are recovered separately through their respective outlets. A sweep gas 18 may optionally be injected through the inlet 17 of the inner tube 11, to increase the flow rate of the $CO_2$ therein.

Figure 2:
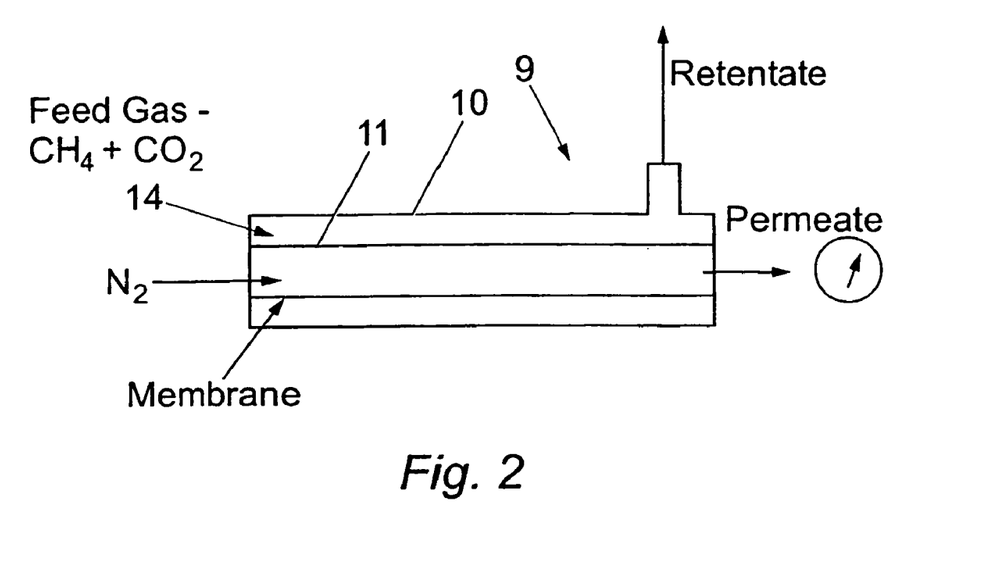

A simplified embodiment of the tube 11 is shown in FIG. 2 with like parts labelled correspondingly.

The efficiency of the membrane 1 in separating $CO_2$ from natural gas is dependent on both the geometry in terms of surface area and flow rate and the membrane 1 characteristics. The tests conducted to date have only considered the factors relating to the membrane and not optimised the geometry. Hence a standard test set up can be used for all testing.

Thus the measures of selectivity and efficiency relate to a staged separation factor. The tests are conducted in two stages using the equipment as per FIG. 2 or FIG. 7.

In a first test, a feed gas was introduced in known $CO_2$ and $CH_4$ composition and mass flow rates and the permeate gas is fed through a flow meter and the concentration of the permeate is analysed ignoring the sweep gas. This gives a measure of the staged separation factor. The retentate gas is free to exhaust.

To calculate the Staged Separation Factor (SSF), the following formula is used:

SSF =(Conc. Of $CH_4$/Conc. Of $CO_2$ in permeate)/
(Conc. Of $CH_4$/Conc. of $CO_2$ in feed)×100

Therefore the lower the SSF the better is the separation efficiency of the separating means (in this case membranes).

In the second test, a feed gas is introduced in known $CO_2$ and $CH_4$ composition and mass flow rates and the retentate gas is fed through a flow meter and the concentration of the retentate is analysed ignoring the sweep gas. This gives a measure of the Staged Recovery Factor. The permeate gas is free to exhaust.

The SRF is calculated using the following formula—

SRF=(Conc. Of $CH_4$/Conc. Of $CO_2$ in retentate)/
(Conc. Of $CH_4$/Conc. of $CO_2$ in feed)×100

Therefore the higher the SRF, the better is the efficiency of the separating means (in this case membranes.) Parameters affecting separation efficiency are discussed in Industrial Gas Separations, pp 132-134 (Schell & Houston) and Gas Purification, Membrane Permeation Processes ppl 242-1245.

Figure 3:
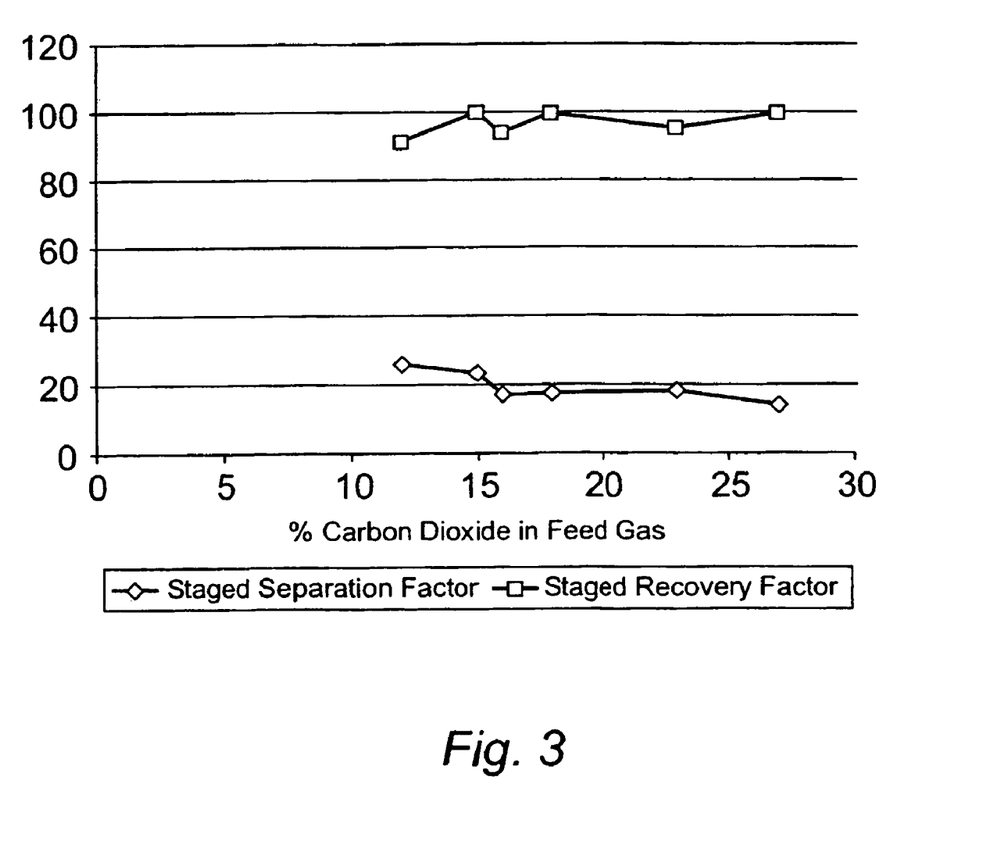
FIG. 3 is a graph showing the recovery and separation factor for an inorganic membrane in accordance with the present invention for different concentrations of carbon dioxide in a feed gas.

SSF and SRF measurements on the present example of an inorganic membrane is shown in FIG. 3.

The measurements were taken under conditions of 1 atmosphere and for a relatively small tube. It is expected that the selectivity of separating $CO_2$ from $CH_4$ will increase when the pressure is increased. Moreover, use of longer tubes or two-three smaller tubes in series will also increase selectivity.

EXAMPLE 2

An inorganic membrane 1 according to the invention comprises a porous ceramic support 2 and a separation layer 3, as shown in FIGS. 1a and 1b.

Example 2 differs from Example 1 only in the composition of separation layer 3 provided. Common features between Example 1 and Example 2 are not described here for example 2.

The separation layer 3 of the Example 2 comprises a gamma-alumina layer (not shown) mounted on the support 2, a silica layer (not shown) and a carbon molecular sieve (not shown).

To form the membrane 1 of the Example 2, the support 2 is exposed to a boemite sol maintained at 0.6 mol/L (as the gamma alumina source) using the dip-coating technique as described for example 1. The support 2 is immersed into the boemite sol for approximately two minutes. The membrane is then air dried overnight and heated to between 700 and 800° C. at a rate of 1° C./minute. The process is normally repeated three times or more to achieve the required thickness of gamma alumina on the support 2, normally between 1-12 µm, preferably 6 µm.

Once the required gamma-alumina layer thickness has been added to the support 2, a silica or carbon molecular sieve layer is then applied to form the final separating layer 3. The silica-layer is deposited over the gamma alumina by the method described above in relation to Example 1.

To deposit the carbon molecular sieve layer, the alumina/silica coated support 2 is dipped in a polyetherimide solution of between 1 and 5 $moll^{-1}$, preferably 3 $moll^{-1}$. The support 2 is then dried in air.

Carbonisation is performed in an argon atmosphere using a predefined temperature profile. In this example, the support was heated from 20-80° C. for 2 hours and then from 80-120° C. for 4 hours although a variety of temperature profiles may be suitably employed. Such a process may be repeated as necessary to achieve the required $CO_2/CH_4$ selectivity and $CO_2$ permeability.

EXAMPLE 3

An inorganic membrane 1 according to the invention comprises a porous ceramic support 2 and a separation layer 3, as shown in FIGS. 1a and 1b.

Example 3 differs from Example 1 only in the composition of separation layer 3 provided. Common features between Example 1 and Example 3 are not described here for Example 3.

The separation layer of Example 3 does not comprise a silica layer in contrast to the previous Examples 1 and 2. A layer of gamma-alumina is added directly onto the support 2 as detailed for Example 2.

The support 2 is then chemically modified by impregnating its surface using magnesium nitrate, $Mg(NO_3)_2$. $Mg(NO_3)_2$ reduces to form magnesium oxide MgO which is thus located in the pores of the separating layer so that the surface concentration is 4 mmols Mg per square metre.

The chemical affinity between the magnesium oxide and the carbon dioxide increases the selectivity of the membrane 1.

The ceramic nature of the inorganic membrane 1 may be used at high temperatures and pressures and in extreme conditions, for example downhole. Moreover, the ceramic materials are resistant to acidic degradation; acids such as carbonic acids being commonly formed thereabouts by the combination of $CO_2$ and $H_2O$. Therefore, embodiments of the invention can be used to separate mixtures of 'wet' gases which would degrade other separating means.

Ceramic materials also have a high mechanical strength.

Embodiments of the invention used downhole have the advantage that acidic gases are removed before transfer by pipeline thereby reducing the corrosion of the pipeline caused by such acidic gases.

The passage of $CO_2$ through the membrane 1 enables continuous production of a relatively pure methane at high pressure making the process extremely cost effective.

Most territories impose restrictions on releasing the environmentally damaging $CO_2$ to the atmosphere and so certain embodiments of the present invention provide a means to remove this gas from natural gas before flaring.

The apparatus according to the present invention may also be used in exhaust stacks to remove, for example, $CO_2$ from exhaust fumes. For example, the impure methane produced from landfill sites may be purified on site and then used as a fuel.

Figure 6A:
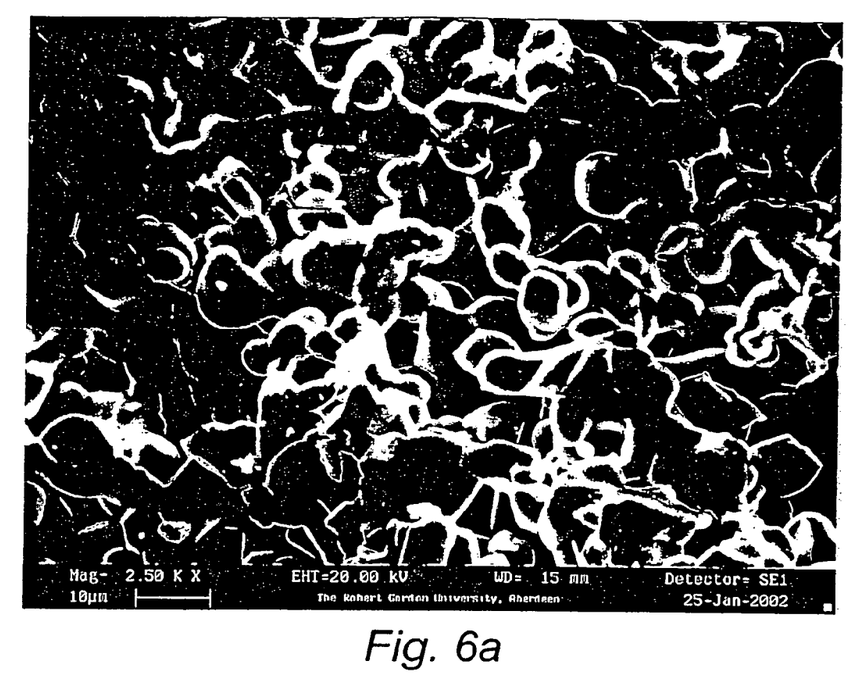
FIG. 6a is a first electron micrograph output showing the structure of an inorganic membrane in accordance with the present invention at a magnification of 2,500.
Figure 6B:
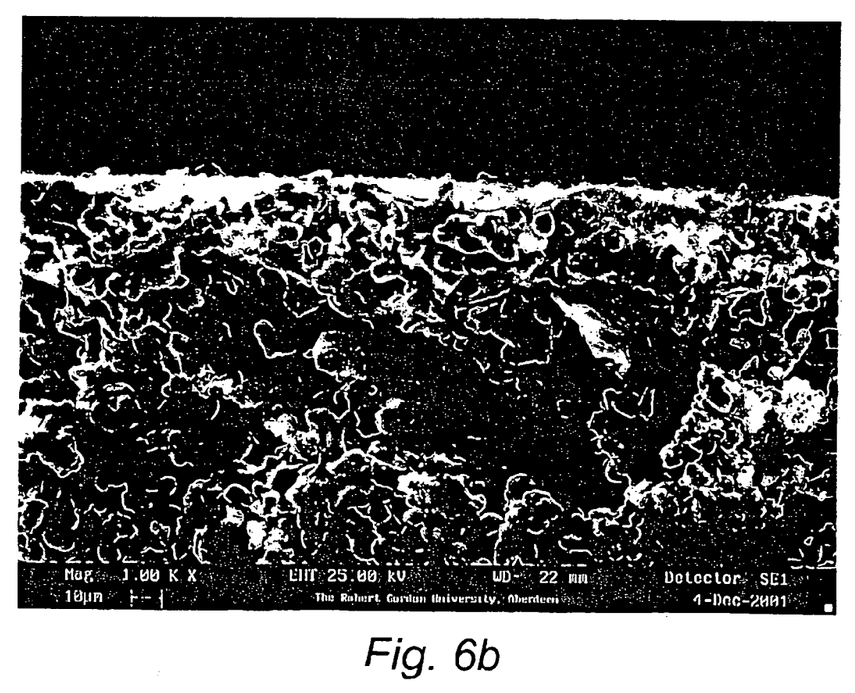
FIG. 6b is a second electron micrograph output of the inorganic membrane at a magnification of 1,000.

The hybrid structures may be characterised by X-ray diffraction, scanning electron microscopy (SEM), nitrogen absorption, X-ray photoelectron spectroscopy, BET surface analysis and EDAX surface elemental analysis. SEM photographs are shown in FIGS. 6a and 6b at 2500 and 1000 times magnification respectively.

Embodiments of the invention may be used to separate other gaseous or fluid mixtures, e.g. $N_2$ or $H_2S$ may be separated from raw natural gas at mildly high temperatures of ~50-100° C. This is permitted by the relative molecular dimensions of $CH_4$, $N_2$, $CO_2$, $H_2O$ and $H_2S$ which are summarised in the table below

| Molecule | Size Å |
|---|---|
| $CH_4$ | 3.8 |
| $CO_2$ | 3.3 |
| $N_2$ | 3.6 |
| $H_2O$ | 2.7 |
| $H_2S$ | 3.6 |
| (Membrane) | 3.6-3.7 A |

Thus, even though $CH_4$ is lighter than the other molecules and so would be expected to penetrate the membrane more readily than the heavier molecules, it has been found that membranes according to the invention allow passage of the heavier molecules while restricting passage of the lighter methane molecules.

Preferably, the selectivity of $CO_2/CH_4$ is 150 at 350° C.; that is 150 $CO_2$ molecules will travel through the membrane for each $CH_4$ molecule that travels through the membrane. Preferably, the selectivity of $CO_2/N_2$ is 120 at 350° C. Preferably, the permeability of $CO_2$ through the membrane 1 is $>4\times10^{-7}$ mol/m²sPa at 350° C. Preferably, the durability of the inorganic membrane 1 is greater than 500 hours at 350° C. in corrosive environments.

An advantage of using ceramic membranes to purify natural gas is their durability. Absorbent performance of known separating means generally decrease with their age whereas the absorbent performance of ceramic materials do not decrease with age. Embodiments including a silica layer are particularly durable.

Further advantages of the use of ceramics in such applications may include enhanced plant performance and a reduction in energy consumption. Ceramic materials may also be used for mixtures with high $CO_2$ concentrations for example, ranging from 3% to 72% $CO_2$.

Improvements and modifications may be made without departing from the scope of the invention.

What is claimed is:

1. An apparatus to separate at least one first gas from a mixture comprising the at least one first gas and at least one second gas, the apparatus comprising a ceramic membrane comprising:
   a support portion; and,
   a separating portion comprising a silica separation portion, the separating portion adapted to permit passage of the at least one first gas therethrough whilst substantially preventing passage of the at least one second gas therethrough;
   wherein the silica separating portion has been prepared from a sol comprising a silicon elastomer by drying the sol.

2. An apparatus as claimed in claim 1, wherein the sol further comprises isopentane.

3. An apparatus as claimed in claim 1, wherein the sol further comprises a curing agent.

4. An apparatus as claimed in claim 1, wherein the ceramic membrane comprises at least one tube having a bore.

5. An apparatus as claimed in claim 4, wherein the at least one tube is corrugated or coiled.

6. An apparatus as claimed in claim 4, wherein the at least one tube comprises an inner tube provided within an impermeable second outer tube and the mixture comprising the at least one first gas and at least one second gas is injected into an annulus between the inner and outer tubes.

7. Apparatus as claimed in claim 6, wherein a graphite seal mounts the inner tube in the outer tube.

8. Apparatus as claimed in claim 1, wherein the separating portion also comprises a layer of gamma alumina.

9. Apparatus as claimed in claim 8, wherein the layer of gamma alumina is provided on the support portion and the silica separating portion is provided on the layer of gamma alumina.

10. A method of manufacturing apparatus comprising a ceramic membrane comprising a separating portion comprising a silica separation portion to separate at least one first gas from a mixture comprising the at least one first gas and at least one second gas, the method comprising
   providing a support portion; and
   forming the silica separation portion by
      immersing the support portion in a sol comprising a silicon elastomer,
      removing the support portion from the sol, and
      converting the silicon elastomer to silica while allowing the support to dry,
   the separating portion adapted to permit passage of the at least one first gas therethrough whilst substantially preventing passage of the at least one second gas therethrough.

11. A method as claimed in claim 10, wherein the sol further comprises isopentane.

12. A method as claimed in claim 10, wherein the sol further comprises a curing agent.

13. A method as claimed in claim 10, wherein the sol is permitted to age over a period of 5-30 minutes before immersing the support in the sol.

14. A method as claimed in claim 10, wherein the support is immersed in the sol for a period of approximately 20 minutes.

15. A method as claimed in claim 10, wherein the support is allowed to dry by applying heat.

16. A method as claimed in claim 15, wherein the support is dried at 65° C. for twenty four hours.

17. A method as claimed in claim 10, wherein the following steps of the method
   immersing the support in a sol;
   removing the support from the sol; and
   allowing the support to dry; are repeated at least once.

18. A method as claimed in claim 10 which is repeated to coat the support with a second sol.

19. A method to separate at least one first gas from a mixture comprising the at least one first gas and at least one second gas, the method comprising the steps of bringing said mixture into contact with a ceramic membrane comprising:
   a support portion; and,
   a separating portion comprising a silica separating portion, the separating portion adapted to permit passage of the at least one first gas therethrough whilst substantially preventing passage of the at least one second gas therethrough;
   wherein the silica separating portion has been prepared from a sol comprising a silicon elastomer by a process that comprises forming the silica from the silicon elastomer by drying the sol;
   such that the at least one first gas passes through the ceramic membrane whilst passage of the at least one second gas through the ceramic membrane is substantially prevented.

20. A method as claimed in claim 19, which is performed in a downhole environment.

21. A method as claimed in claim 19, wherein the at least one first gas and the at least one second gas are recovered for subsequent use.

22. An apparatus to separate at least one first gas from a mixture comprising the at least one first gas and at least one second gas, the apparatus comprising a first tube and a second tube, the first tube comprising a ceramic membrane which comprises:
   a support portion; and,
   a separating portion comprising a silica separating portion, the separating portion adapted to permit passage of the at least one first gas through the ceramic membrane whilst substantially preventing passage of the at least one second gas through the ceramic membrane;
   wherein the silica separating portion has been prepared from a sol comprising a silicon elastomer by a process that comprises the silica being formed from the silicon elastomer while the sol is permitted to dry,
   the first tube being mounted substantially within the second tube and being sealed therein by a graphite seal.

* * * * *